United States Patent [19]

Hammond et al.

[11] 4,273,663
[45] Jun. 16, 1981

[54] QUATERNARY AMMONIUM DIESTER SALT COMPOSITION AND LUBRICATING OIL CONTAINING SAME

[75] Inventors: Kenneth G. Hammond; Harry Chafetz, both of Poughkeepsie, N.Y.

[73] Assignee: Texaco Inc., White Plains, N.Y.

[21] Appl. No.: 93,481

[22] Filed: Nov. 13, 1979

[51] Int. Cl.$^3$ .............................................. C10M 1/32
[52] U.S. Cl. ...................................... 252/34; 252/33; 252/49.6; 252/51.5 A; 252/56 D; 546/13; 546/255
[58] Field of Search .................. 252/34, 51.5 A, 56 D, 252/33, 49.6; 260/567.6 R, 567.6 H; 546/13, 255

[56] References Cited

U.S. PATENT DOCUMENTS

| | | | |
|---|---|---|---|
| 2,830,021 | 4/1958 | Smith et al. | 252/34 |
| 3,485,755 | 12/1969 | Grimm et al. | 252/34 X |
| 3,522,179 | 7/1970 | Le Suer | 252/51.5 A |
| 3,778,371 | 12/1973 | Malec | 252/34 |
| 3,950,341 | 4/1976 | Okamoto et al. | 252/34 X |

*Primary Examiner*—Andrew Metz

*Attorney, Agent, or Firm*—Carl G. Ries; Robert A. Kulason; James J. O'Loughlin

[57] ABSTRACT

A quaternary ammonium salt of a diester which can be represented by the formula:

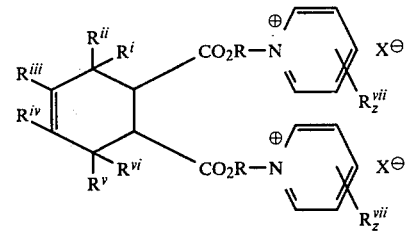

in which $R^i$, $R^{ii}$, $R^{iii}$, $R^{iv}$, $R^v$ and $R^{vi}$ represent hydrogen, alkyl or alkenyl radicals at least one of which is a hydrocarbyl radical having from 50–200 carbon atoms, R is a divalent radical having from 2–10 carbon, or carbon and oxygen atoms, $R^{vii}$ is hydrogen or a hydrocarbyl radical, z has a value from 0–4 and X is an anion is provided, as well as a method of preparation and a hydrocarbon lubricating oil composition containing same.

31 Claims, No Drawings

QUATERNARY AMMONIUM DIESTER SALT COMPOSITION AND LUBRICATING OIL CONTAINING SAME

BACKGROUND OF THE INVENTION

1. Field of the Invention

Internal combustion engines operate under a wide range of temperatures including low-temperature stop-and-go service as well as high temperature conditions produced by continuous high speed driving. Stop-and-go driving, particularly during cold, damp weather conditions, leads to the formation of a sludge in the crankcase and oil passages of a gasoline engine. This sludge seriously limits the ability of the crankcase oil to lubricate the engine. In addition, the sludge tends to contribute to rust formation within the engine. The noted problems are compounded by lubrication service maintenance recommendations calling for extended oil drain intervals.

It is known to employ nitrogen-containing dispersants and/or detergents in the formulation of crankcase lubricating oil compositions. Many of the known dispersant/detergent compounds are based on the reaction of an alkenylsuccinic acid or anhydride with an amine or polyamine to produce an alkenylsuccinimide or an alkenylsuccinamic acid as determined by selected conditions of reaction.

It is also known to chlorinate alkenylsuccinic acid or anhydride prior to the reaction with an amine or polyamine in order to produce a reaction product in which a portion of the amine or polyamine is attached directly to the alkenyl radical of the alkenylsuccinic acid or anhydride. The thrust of many of these processes is to produce a dispersant having a relatively high level of nitrogen. The noted known processes generally result in the production of a dispersant reaction product typically containing from about 0.5 to 5% nitrogen. These dispersant additives exhibited a high degree of oil solubility and have been found to be effective for dispersing the sludge that is formed under severe low temperature stop-and-go engine operating conditions. However, it has become increasingly difficult to formulate lubricants with these additives which meet the present requirements with respect to the prevention or inhibition of the formation of varnish.

2. Description of the Prior Art

U.S. Pat. No. 3,522,179 discloses esters of hydrocarbon-substituted succinic acid which are prepared by reacting a chlorinated polyolefin with maleic anhydride to form an intermediate hydrocarbon-substituted succinic anhydride and then reacting the intermediate with a glycol, such as neopentyl glycol, or polyethylene glycol to form an acid ester.

U.S. Pat. No. 3,778,371 discloses lubricant and fuel compositions containing N-hydrocarbyl-substituted quaternary ammonium salts prepared by reacting a high molecular weight aliphatic hydrocarbon halide with a tertiary amine.

A copending application, Ser. No. 053,010, filed June 28, 1979, discloses quaternary ammonium diester salts formed from non-halogenated precursors.

SUMMARY OF THE INVENTION

The quaternary ammonium diester salt of this invention can be represented by the formula:

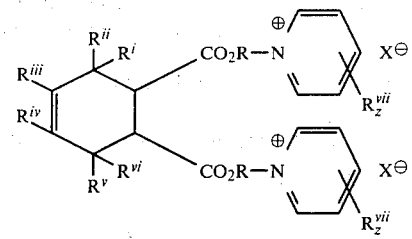

in which $R^i$, $R^{ii}$, $R^{iii}$, $R^{iv}$, $R^v$ and $R^{vi}$ represent hydrogen, alkyl or alkenyl radicals at least one of which is a hydrocarbyl radical having from 50–200 carbon atoms, R is a divalent radical having from 2–10 carbon, or carbon and oxygen atoms, $R^{vii}$ is hydrogen or a hydrocarbyl radical, z has a value from 0–4 and x is an anion selected from the group consisting of halides, sulfates, carbonates, sulfites, borates, carboxylates and phosphates.

The novel quaternary diester salt is prepared by reacting a hydrocarbyl-succinic anhydride with a haloalcohol, employing a mole ratio of one mole of a hydrocarbon-substituted anhydride with two or more moles of a halogenated monohydric alcohol in the presence of an acid-reacting catalyst followed by a reaction with a heterocyclic tertiary amine to produce the prescribed quaternary ammonium salt.

The dispersant detergent lubricating oil composition of the invention comprises a lubricating oil base and an effective amount of the prescribed quaternary ammonium salt.

DESCRIPTION OF THE PREFERRED EMBODIMENTS

The quaternary ammonium salt of a diester of this invention can be represented by the formula:

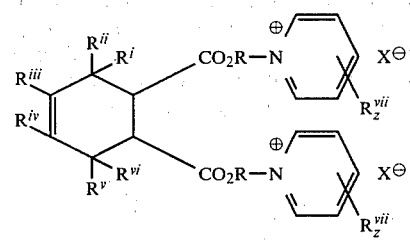

in which $R^i$, $R^{ii}$, $R^{iii}$, $R^{iv}$, $R^v$ and $R^{vi}$ represent hydrogen, alkyl or alkenyl radicals at least one of which is a hydrocarbyl radical having from 50–200 carbon atoms, R is a divalent radical having from 2–10 carbon, or carbon and oxygen atoms, $R^{vii}$ is hydrogen or a hydrocarbyl radical, z has a value from 0–4 and X is an anion selected from the group consisting of halides, sulfates, carbonates, sulfites, borates, carboxylates, and phosphates.

In the above formula, the divalent radical represented by R can be an aliphatic hydrocarbon radical or it can be an ether or a polyether radical represented by the formulas:

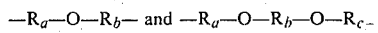

$$-R_a-O-R_b- \text{ and } -R_a-O-R_b-O-R_c-$$

wherein $R_a$, $R_b$ and $R_c$ are aliphatic hydrocarbon radicals having from 2 to 4 carbon atoms each.

The hydrocarbon radical represented by $R^{vii}$ in the above formula can be an aliphatic hydrocarbon radical or an aromatic radical, or one or two pairs of $R^{vii}$ can be interconnected to form one or two fused aromatic rings respectively with the principal heterocyclic aromatic ring.

When X is a halide it is preferably a chloride or a bromide ion.

A preferred quaternary ammonium diester salt can be represented by the formula:

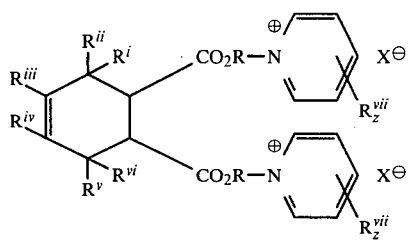

in which $R^i$, $R^{ii}$, $R^{iii}$, $R^{iv}$, $R^v$ or $R^{vi}$ is a hydrocarbyl radical having from 50 to 200 carbon atoms; and the remaining substituents are lower alkyl or alkenyl groups of ten carbon atoms or less or are hydrogen atoms, R is a divalent hydrocarbon radical having from 2 to 6 carbon atoms, X is an anion selected from the group consisting of chloride, bromide, sulfate and borate ions, $R^{vii}$ is hydrogen or an aliphatic hydrocarbon radical having from 1 to 3 carbon atoms and z has a value from 0–2.

The prescribed quaternary ammonium diester salt of the invention is prepared in a two-step reaction. In general, a hydrocarbyl succinic anhydride is reacted with a halogenated alcohol in the presence of an acidic catalyst to produce the intermediate diester. This, in turn, is reacted with a heterocyclic tertiary amine to produce the quaternary ammonium salt of the diester.

Numerous methods for the preparation of hydrocarbyl-succinic acid anhydrides are known to those skilled in the art. The hydrocarbyl succinic anhydrides useful in this invention are those prepared by heating a chlorinated polyolefin with maleic anhydride. Spectral and chemical evidence suggest that a hydrocarbyl succinic anhydride of the following formula:

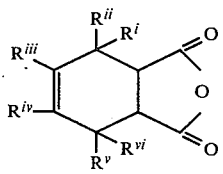

in which $R^i$, $R^{ii}$, $R^{iii}$, $R^{iv}$, $R^v$ and $R^{vi}$ have the same values as noted above for the finished salt, is the predominant product formed.

The chlorinated polyolefin employed in this reaction is one obtained by chlorinating to 1.0 to 6.0% chlorine the product derived from the polymerization of a $C_2$ to $C_6$ monolefin or a mixture of monoolefins under conventional polymerization conditions. The optimum chlorine content is inversely proportional to the molecular weight of the polyolefin. The initial polymer will be an unsaturated polymer having a molecular weight corresponding to the desired molecular weight of the hydrocarbyl radical in the prescribed quaternary ammonium diester salt, i.e., a molecular weight from about 700 to 2800 as determined by vapor pressure osmometry.

The synthesis of the subject hydrocarbyl succinic anhydride is described in the following U.S. patents, namely, U.S. Pat. Nos. 3,272,746, 3,284,410, 3,346,493 and 3,522,179 the disclosures of which are incorporated herein by reference.

Examples of specific hydrocarbyl succinic acid anhydrides which can be employed for preparing the prescribed quaternary ammonium diester salts of this invention include those prepared by the reaction of maleic anhydride with chlorinated polybutene, chlorinated polypropylene and chlorinated polypentene.

The haloalkanol, which can be employed for preparing the intermediate diester salt, is represented by the formula X—R—OH in which X is a halogen atom and R is a divalent radical having from 2 to 10 carbon, or carbon and oxygen atoms. The halogen atom can be a chlorine, bromine or an iodine atom, with the chlorine atom being preferred. Typical examples of suitable haloalkanol compounds include 2-chloroethanol, 2-bromoethanol, 3-chloropropanol, 3-bromopropanol, 4-chlorobutanol, 4-bromobutanol, 4-iodobutanol, 5-chloropentanol, 5-bromopentanol, 6-chlorohexanol, 6-bromohexanol, and 2-(2-chloroethoxy)-ethanol.

The mole ratio of haloalkanol to hydrocarbyl succinic anhydride which can be used to prepare the intermediate product necessary in the reaction leading to the prescribed quaternary ammonium salt of a diester is from 2.0 to 10.0 moles of haloalkanol to 1 mole of hydrocarbyl succinic anhydride with the preferred ratio being from 2.0 to 2.5 moles of the haloalkanol to a mole of hydrocarbyl succinic anhydride. The lower mole ratio of 2 moles of haloalkanol to 1 mole of the anhydride is a critical limitation in the process leading to the preparation of the prescribed diester salts. High mole ratios of the haloalkanol have no significant effect on the amount of the intermediate product produced.

The reaction of a hydrocarbyl succinic anhydride with a haloalkanol to form the diester precursor of the prescribed quaternary ammonium diester salt must be conducted either concurrently or sequentially in the presence of an acid-reacting catalyst. This catalyst serves to promote the esterification reaction. Suitable acid-reacting catalysts include sulfuric acid, phosphoric acid, polyphosphoric acid, sulfonic acid, p-toluene sulfonic acid, phosphonic acid, hydrogen chloride, hydrogen bromide, sulfonated cation exchange resins and crystalline alumino-silicate in the acid form.

The amount of the acid-reacting catalyst used is not critical. In general, from about 0.2 to 5.0 weight percent of the acid-catalyst based on the amount of the hydrocarbyl succinic acid anhydride will promote the esterification reaction.

This reaction can be conducted over a broad range of temperatures. Useful temperatures range from about 20° to 150° C. with the preferred reaction temperature being from about 80° to 120° C.

The intermediate diester product produced in the first step of this process leading to the prescribed quaternary ammonium salt can be represented by the formula:

The following Table gives the details of preparation and the results obtained in Examples 1 through 3 for the diester intermediate product.

TABLE I

| | INTERMEDIATE DIESTER | | | | | | |
|---|---|---|---|---|---|---|---|
| | REACTANTS | | | | | ANALYSIS OF PRODUCT | |
| | Moles of Hydrocarbyl Succinic Anhydride[1] | Moles of Haloalkanol[2] | Moles of Sulfuric Acid | Procedure | Mole Ratio Anh./Alc./ Acid | Reaction Conditions | |
| Example | | | | | | Temp. °C. | Time Hr. | % Chlorine |
| 1 | 0.17 | 1.7 | 0.04 | A | 1-10-0.25 | 115 | 18 | 4.10 |
| 2 | 1.6 | 17.0 | 0.17 | A | 1-10.8-0.11 | 115 | 8 | 5.17 |
| 3 | 0.30 | 2.0 | 0.03 | A | 1-6.7-0.1 | 80 | 5 | 5.52 |

[1] The anhydride of Example 1 was prepared from chlorinated polyisobutene of about 1300 m.w. and had 0.17% Cl and a 75.9 sap. no. The anhydride of Examples 2 and 3 was prepared from chlorinated polyisobutene of about 1100 m.w. and had 0.51% Cl and a 90.8 sap. no.

[2] 2-chloroethanol was used in Examples 1 and 2; 4-chlorobutanol was used in Example 3.

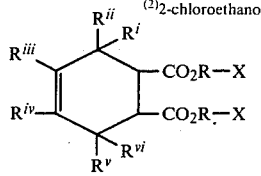

in which R, $R^i$, $R^{ii}$, $R^{iii}$, $R^{iv}$, $R^v$, and $R^{vi}$ have the same values noted above for the finished salt, and X is a halogen atom.

The intermediate diester product is reacted with a tertiary heteroaromatic amine in order to form the prescribed quaternary ammonium salt. The effective tertiary heteroaromatic amine is represented by the formula:

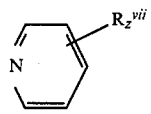

in which z is a number from 0 to 4 and $R^{vii}$ is hydrogen, or a hydrocarbyl radical having from 1 to 8 carbon atoms, or one or two pairs of "R"s are interconnected to form one or two fused aromatic rings respectively.

The preferred heteroaromatic amine is one in which $R^{vii}$ is hydrogen or a lower aliphatic hydrocarbon radical having from 1 to 4 carbon atoms.

Examples of suitable tertiary heteroaromatic amines include pyridine, 3,4-dimethylpyridine, 4-methylpyridine, quinoline, isoquinoline and phenazine.

Procedure A, following, describes the method that was employed for preparing the diester intermediate used in the preparation of the prescribed quaternary ammonium salt compounds of this invention.

PROCEDURE A

A chlorinated polyisobutene/maleic anhydride derived hydrocarbyl succinic anhydride, the haloalcohol and the acid catalyst are charged to an appropriate sized flask equipped with a reflux condenser, stirrer and thermometer. The mixture is heated at the specified temperature for the indicated time period. The reflux condenser is removed and a distillation head is installed after which the mixture is further heated at 120°-130° C. under reduced pressure in order to remove small amounts of volatile materials (primarily unreacted alcohol) and to complete formation of the product. The product is then subjected to infrared analysis. Ester formation is indicated by a strong absorption at the 1740 $cm^{-1}$ wavelength.

EXAMPLES 4-6

The prescribed quaternary ammonium diester salts of this invention were prepared by one of the following procedures.

The appearance of the additive can often be beneficially modified by conducting the ester/amine reaction in the presence of a base to neutralize amine hydrochloride and/or boric acid to minimize color body formation. In addition, it will be appreciated that the performance and/or appearance of the additive can often be beneficially modified by exchanging the halide in the compound with another anion, such as a borate, sulfate, phosphate, phosphonate, sulfite or sulfonate, disclosed above. In general, the original quaternary ammonium diester salt is mixed with an acidic compound having the desired anion prescribed hereinabove and reacted therewith at a moderately elevated temperature ranging from about 80° to 120° C., while removing the displaced hydrogen halide under reduced pressure. The resulting modified salt is significantly improved as a lubricating oil additive.

PROCEDURE B

The ester and the tertiary amine are charged to an appropriately sized flask equipped with a reflux condenser, stirrer, nitrogen inlet tube, and thermometer. The mixture is stirred and heated under a nitrogen atmosphere at the specified temperature for the indicated time period. The mixture is diluted with a light hydrocarbon, (heptane or isooctane) and a measured amount of mineral oil, filtered through diatomaceous earth, and then stripped at 90°-100° C. under a vacuum of from 1-25 mm of mercury to remove the light hydrocarbon and the unreacted amine and yield the product.

PROCEDURE C

The reaction product obtained according to Procedure B (100 parts) is diluted with a light hydrocarbon (heptane or isooctane, 200 parts) and the resulting solution is extracted with methanol (100 parts). The methanol layer is allowed to separate and is then removed from the vessel and discarded. The remaining light hydrocarbon solution is stripped at 90°-100° C. under a 1-25 mm Hg vacuum to yield an oil concentrate of the product. The extraction removes residual amine and some low molecular weight quaternary salts from the initial product.

The reactants, reaction parameters and product analyses for Examples 4 through 7 are summarized in Table II below:

TABLE II

| Ex. No. | Diester Ex. No. in Table I | Gr. | Tertiary Amine Identity | Tertiary Amine Grams | Mole Ratio Amine/ Chloride in Diester | Prep. Procedure (1) | Product Analyses (2) % Chlorine | Product Analyses (2) % Nitrogen |
|---|---|---|---|---|---|---|---|---|
| 4 | 1 | 190 | 4-Picoline | 96 | 4.7 | C | (3) | (3) |
| 5 | 2 | 276 | 4-Picoline | 215 | 5.8 | B | 2.30 | 0.93 |
| 6 | 2 | 276 | 4-Picoline | 215 | 5.8 | C | 1.66 | 0.51 |
| 7 | 3 | 200 | 4-Picoline | 143 | 5.0 | C | 1.30 | 0.49 |

(1) Reaction conditions: Example 4: 130° C. (7 hrs.); Examples 5 and 6: 130° C. (8 hours);Example 7: 130° C. (7 hours), mixture contained 20 gr. of sodium carbonate.
(2) Samples contained 50% diluent oil.
(3) Not determined.

The lubricant composition of the invention comprises a major amount of a mineral, hydrocarbon oil or synthetic oil of lubricating viscosity and an effective detergent-dispersant amount of the prescribed quaternary ammonium salt of a diester. Advantageously, in the finished lubricating oil composition, the prescribed quaternary ammonium diester salt content ranges between about 0.1 and 10 percent by weight, preferably between about 0.5 and 5 weight percent. In the lubricating oil concentrates, from which the finished lubricating compositions are derived via the addition of added lubricating oil, quaternary ammonium diester salt contents between about 10 and 50 weight percent are found.

The hydrocarbon oil in the finished lubricating composition advantageously constitutes at least about 85 weight percent and preferably between about 90 and 98 weight percent of the composition, and in the lube oil concentrates between about 50 and 90 weight percent of the composition. It is to be noted that even in the lubricating oil concentrates the prescribed quaternary ammonium diester salt will exhibit detergent-dispersancy as well as varnish inhibition.

Examples of the hydrocarbon base oil contemplated herein are the naphthenic base, paraffinic base and mixed base mineral oils, lubricating oils derived from coal products and synthetic oils, e.g., alkylene polymers such as polypropylene and polyisobutylene of a molecular weight of between about 250 and 2500. Advantageously, a lubricating base oil having a lubricating oil viscosity at 100° F. of between about 50 and 100, preferably between about 100 and 600, are normally employed for the lubricant compositions and concentrates thereof. (SUS basis)

In the contemplated finished lubricating oil compositions other additives may be included in addition to the dispersant of the invention. The additives may be any of the suitable standard pour depressants, viscosity index improvers, oxidation and corrosion inhibitors, anti-foamants, supplementary detergent-dispersants, etc. The choice of the particular additional additives to be included in the finished oils and the particular amounts thereof will depend on the use and conditions desired for the finished oil product.

Specific examples of the supplementary additives are as follows:

A widely used and suitable VI improver is the polymethacrylate having the general formula:

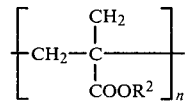

where $R^2$ is an aliphatic radical of from 1 to 20 carbons and n is an integer of between about 600 and 35,000. One of the most suitable VI improvers is the tetrapolymer of butyl methacrylate, dodecyl methacrylate, octadecyl methacrylate, and dimethylaminoethyl methacrylate having a respective component weight ratio in the polymer of about 4:10:5:1. Another VI improver is a copolymer of ethylene and propylene having a molecular weight of 20,000 to 50,000 containing 30 to 40 percent propylene in the copolymer in admixture with solvent neutral oil (100 E Pale Oil) comprising 13 weight percent copolymer and 87 weight percent oil. The VI improvers are normally employed in the finished lubricant compositions in quantities between about 0.1 and 10 percent by weight.

One of the commonly employed lube oil corrosion inhibitors and antioxidants are the divalent dialkyl dithiophosphates resulting from the neutralization of a $P_2S_5$-alcohol reaction product with a divalent metal or divalent metal oxide. Barium and zinc dialkyl dithiophosphate are specific examples. Another class of antioxidants are the polyalkylated diphenylamines, such as a mixture of 2,2'-diethyl-4,4'-dioctyldiphenylamine and 2,2'-diethyl-4-octyldiphenylamine. The corrosion and oxidation inhibitors are usually present in the finished lubricating oil compositions in concentrations of between about 0.1 and 3 weight percent.

Examples of supplementary detergent-dispersants which can be employed are the monoethoxylated inorganic phosphorus acid-free, steam hydrolyzed polyalkylene (500–50,000 m.w.)-$P_2S_5$ reaction product, alkaline earth metal alkylphenolates, such as barium nonylphenolate, barium dodecylcresolate, calcium dodecylphenolate and the calcium carbonate overbased calcium alkaryl sulfonates formed by blowing a mixture of calcium hydroxide and a calcium alkaryl sulfonate, e.g., calcium alkylbenzene sulfonate of about 900 m.w. with carbon dioxide to form a product having a total base number (TBN) of 50 to more, e.g., 300 to 400.

If antifoamants are employed in the finished compositions, one widely used class which is suitable are the dimethyl silicone polymers employed in amounts of between about 10 and 1000 ppm.

The following test was employed to determine the dispersancy and varnish inhibiting effect of the lubricant composition of the invention:

BENCH VC TEST

In the Bench VC Test, a mixture containing the test oil and a diluent are heated at an elevated temperature. After heating, the turbidity of the resultant mixture is measured. A low % turbidity (0–10) is indicative of good dispersancy while high results (20–100) are indicative of oils of increasingly poor dispersancy.

EXAMPLE 8

A fully formulated SAE Grade 10W-40 lubricating oil composition containing the quaternary ammonium salt of a diester of the invention was tested for its dispersing effectiveness in the Bench VC Test in comparison to a fully formulated base oil without the amine salt dispersant, and to fully formulated lubricating oil compositions containing a commercial succinimide dispersant.

The base blend employed contained the following conventional additives:

0.15 weight % zinc as zinc dialkyldithiophosphate
0.23 weight % calcium as overbased calcium sulfonate
0.25 weight % alkylated diphenylamine antioxidant
11.5 weight % ethylene-propylene copolymer VI improver
0.15 weight % ethoxylated alkylphenol
0.10 weight % methacrylate pour depressant
150 ppm silicone antifoamant
mineral oil—balance The quaternary ammonium diester salt dispersant of the invention was added to the base blend at two concentrations on an oil-free basis and then tested in the Bench VC Test.

The results are set forth in the table below:

TABLE III

| | BENCH VC TEST | |
|---|---|---|
| Run | Wt. % of Additive in Base Blend | Turbidity |
| 1 | Base Blend (no dispersant) | 97.5 |
| 2 | Example 4 - 4.0 | 2.0 |
| 3 | Example 4 - 3.0 | 2.5 |
| 4 | Example 5 - 4.0 | 2.5 |
| 5 | Example 5 - 3.0 | 6.5 |
| 6 | Example 6 - 4.0 | 2.0 |
| 7 | Example 6 - 3.0 | 5.0 |
| 8 | Example 7 - 4.0 | 2.0 |
| 9 | Example 7 - 3.0 | 2.5 |
| 10 | Succinimide Dispersant - 4.0 | 4.0 |
| 11 | Succinimide Dipersant - 3.0 | 9.5 |

The foregoing tests demonstrate that the prescribed quaternary amine salts of diesters are excellent dispersants for a lubricating oil composition and exhibit superior effectiveness in comparison to a commercial succinimide dispersant.

We claim:

1. A quaternary ammonium diester salt composition represented by the formula:

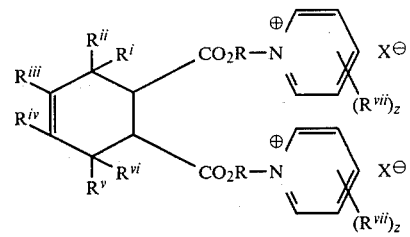

in which $R^i$, $R^{ii}$, $R^{iii}$, $R^{iv}$, $R^v$ $R^{vi}$ represent hydrogen, alkyl or alkenyl hydrocarbyl radicals at least one of which is a hydrocarbyl radical having from 50–200 carbon atoms, R is a divalent radical having from 2–10 carbon, or carbon and oxygen atoms, $R^{vii}$ is hydrogen or a hydrocarbyl radical, z has a value from 0–4 and X is an anion selected from the group consisting of halides, sulfates, carbonates, sulfites, borates, carboxylates, and phosphates.

2. A quaternary ammonium diester salt according to claim 1 in which R is a divalent hydrocarbon radical having from 2 to 6 carbon atoms and $R^{vii}$ is hydrogen or an alkyl radical having from 1 to 3 carbon atoms.

3. A quaternary ammonium diester salt according to claim 1 in which the hydrocarbyl radical represented by $R^i$, $R^{II}$, $R^{iii}$, $R^{iv}$, $R^V$ or $R^{vi}$ has from 75 to 150 carbon atoms.

4. A quaternary ammonium salt according to claim 1 in which said anion is the chloride ion.

5. A quaternary ammonium salt according to claim 1 in which said anion is the sulfate ion.

6. A quaternary ammonium salt according to claim 1 in which said anion is a borate ion.

7. A quaternary ammonium diester salt composition represented by the formula:

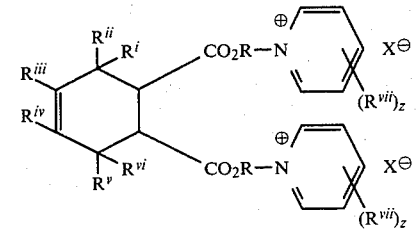

in which at least one of the substituents $R^i$, $R^{ii}$, $R^{iii}$, $R^{iv}$, $R^v$ or $R^{vi}$ represents a hydrocarbyl radical having from 50 to 200 carbon atoms and the remaining substituents represent hydrogen or methyl radicals, R is a divalent hydrocarbon radical having from 2 to 6 carbon atoms, X is an anion selected from the group consisting of chloride, bromide, sulfate and borate ions, $R^{vii}$ is hydrogen or an aliphatic hydrocarbon radical having from 1 to 3 carbon atoms and z has a value from 0 to 2.

8. A quaternary ammonium diester salt according to claim 7 in which the hydrocarbyl radical represented by $R^i$, $R^{ii}$, $R^{iii}$, $R^{iv}$, $R^v$ or $R^{vi}$ has from 75 to 150 carbon atoms.

9. A quaternary ammonium diester salt according to claim 8 in which the hydrocarbyl radical is a polyisobutenyl radical.

10. A quaternary ammonium diester salt according to claim 7 in which R is a divalent hydrocarbon radical having from 2 to 4 carbon atoms and $R^{vii}$ is hydrogen or a methyl radical.

11. A quaternary ammonium salt according to claim 7 in which said anion is the chloride ion.

12. A quaternary ammonium salt according to claim 7 in which said anion is a borate ion.

13. A lubricating oil composition comprising a major portion of a mineral lubricating oil and a minor dispersant amount of a quaternary ammonium diester salt composition represented by the formula:

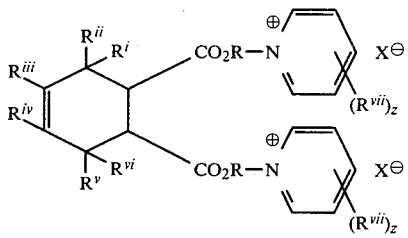

in which $R^i$, $R^{ii}$, $R^{iii}$, $R^{iv}$, $R^v$, and $R^{vi}$ represent hydrogen, alkyl or alkenyl hydrocarbyl radicals at least one of which is a hydrocarbyl radical having from 50–200 carbon atoms, R is a divalent radical having from 2–10 carbon, or carbon and oxygen atoms, $R^{vii}$ is hydrogen or a hydrocarbyl radical, z has a value from 0 to 4, and X is an anion selected from the group consisting of halides, sulfates, carbonates, sulfites, borates, carboxylates, and phosphates.

14. A lubricating oil composition according to claim 13 having a quaternary ammonium diester salt in which R is a divalent hydrocarbon radical having from 2 to 6 carbon atoms and $_Rv^{ii}$ is hydrogen or an alkyl radical having from 1 to 3 carbon atoms.

15. A lubricating oil composition according to claim 13 having a quaternary ammonium diester salt in which the hydrocarbyl radical represented by $R^i$, $R^{ii}$, $R^{iii}$, $R^{iv}$, $R^v$ or $R^{vi}$ has from 75 to 150 carbon atoms.

16. A lubricating oil composition according to claim 13 having a quaternary ammonium diester salt in which said anion is the chloride ion.

17. A lubricating oil composition according to claim 13 having a quaternary ammonium diester salt in which said anion is the sulfate ion.

18. A lubricating oil composition according to claim 13 having a quaternary ammonium diester salt in which said anion is a borate ion.

19. A lubricating oil composition comprising a major portion of a mineral lubricating oil and a minor dispersant amount of a quaternary ammonium diester salt composition represented by the formula:

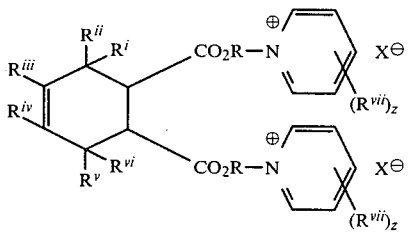

in which at least one of the substituents $R^i$, $R^{ii}$, $R^{iii}$, $R^{iv}$, $R^v$ or $R^{vi}$ represents a hydrocarbyl radical having from 50 to 200 carbon atoms and the remaining substituents represent hydrogen or methyl radicals, R is a divalent hydrocarbon radical having from 2 to 6 carbon atoms, X is an anion selected from the group consisting of chloride, bromide, sulfate and borate ions, $R^{vii}$ is hydrogen or an aliphatic hydrocarbon radical having from 1 to 3 carbon atoms and z has a value from 0 to 2.

20. A lubricating oil composition according to claim 19 having a quaternary ammonium diester salt in which the hydrocarbyl radical represented by $R^i$, $R^{ii}$, $R^{iii}$, $R^v$ or $R^{vi}$ has from 75 to 150 carbon atoms.

21. A lubricating oil composition according to claim 19 having a quaternary ammonium diester salt in which said hydrocarbon radical is a polyisobutenyl radical.

22. A lubricating oil composition according to claim 19 having a quaternary ammonium diester salt in which R is a divalent hydrocarbon radical having from 2 to 6 carbon atoms and $R^{vii}$ is hydrogen or an alkyl radical having from 1 to 3 carbon atoms.

23. A lubricating oil composition according to claim 19 having a quaternary ammonium salt in which said anion is the chloride ion.

24. A lubricating oil composition according to claim 19 having a quaternary ammonium salt in which said anion is a borate ion.

25. A method for preparing a quaternary ammonium diester salt composition which comprises reacting a chlorinated polyolefin having from 50 to 200 carbon atoms, with maleic anhydride to produce a hydrocarbyl succinic acid anhydride in which said hydrocarbyl radical has from 50 to 200 carbon atoms, reacting said hydrocarbyl succinic acid anhydride derivative with a haloalcohol represented by the formula X-R-OH in which R is a divalent radical having from 2 to 10 carbon, or carbon and oxygen atoms in the presence of an acid reacting catalyst employing a mole ratio of 2 to 10 moles of said haloalcohol per mole of said anhydride to produce an intermediate diester product and reacting said intermediate diester product with a tertiary amine represented from the formula:

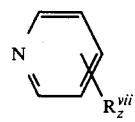

in which $R^{vii}$ is hydrogen or a hydrocarbyl radical having from 1 to 3 carbon atoms and z has a value from 0 to 4.

26. A method according to claim 25 in which said hydrocarbyl radical has from about 75 to 150 carbon atoms.

27. A method according to claim 25 in which said haloalcohol is 2-chlorobutanol and said tertiary amine is 4-picoline.

28. A method according to claim 25 in which said haloalcohol is 4-chlorobutanol and said tertiary amine is 4-picoline.

29. A method according to claim 25 in which said acid reacting catalyst is sulfuric acid.

30. A method according to claim 25 in which the mole ratio of said haloalcohol to said anhydride is from 2 to 2.5.

31. A method according to claim 25 in which said quaternary ammonium diester salt is further reacted with an acid selected from the group consisting of sulfuric acid, carbonic acid, sulfurous acid, boric acid, carboxylic acids and phosphoric acid.

* * * * *